UNITED STATES PATENT OFFICE.

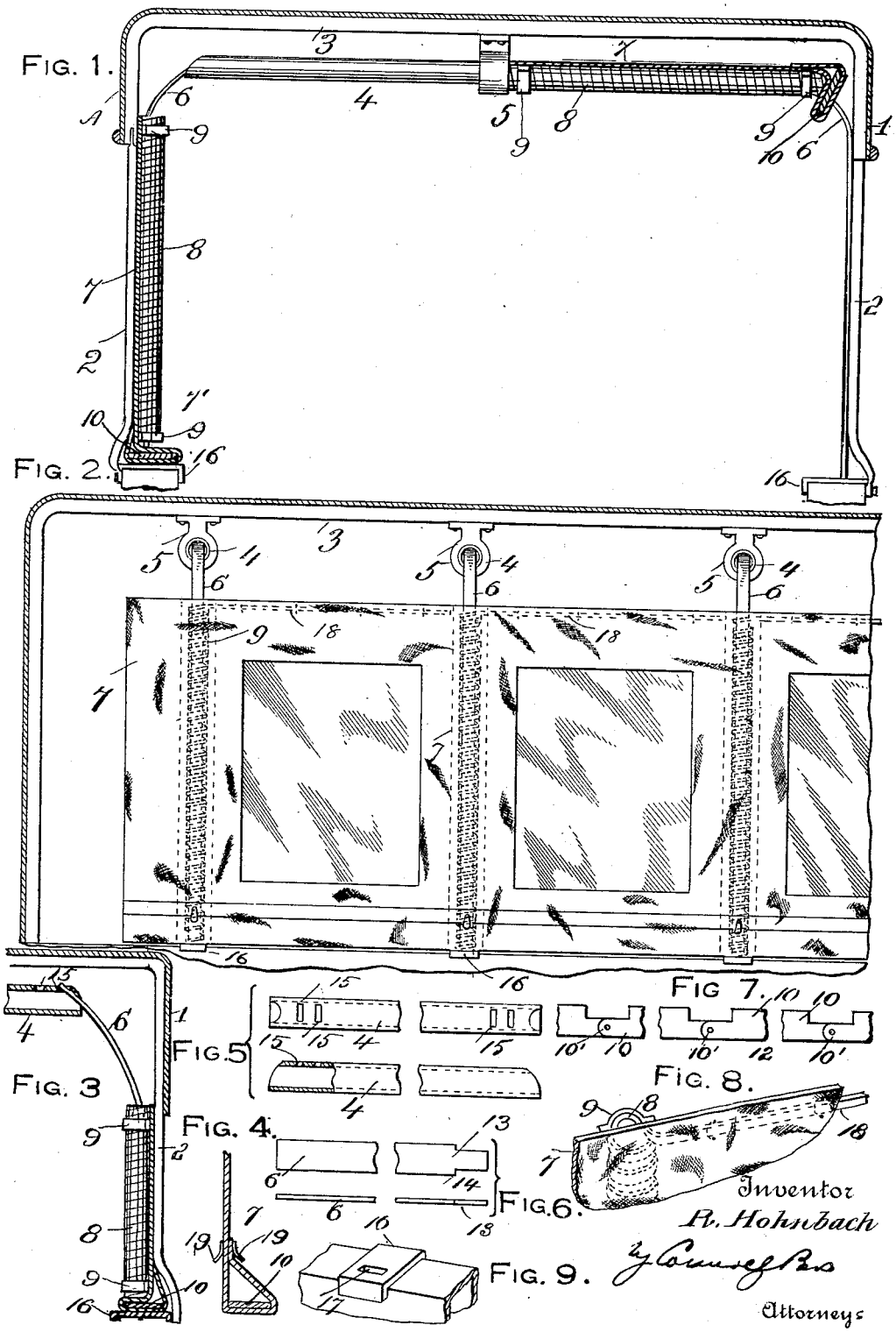

ROBERT HOHNBACH, OF CHICAGO, ILLINOIS.

SLIDING CURTAIN FOR VEHICLES.

1,319,958.  Specification of Letters Patent.  Patented Oct. 28, 1919.

Application filed July 17, 1918. Serial No. 245,434.

*To all whom it may concern:*

Be it known that I, ROBERT HOHNBACH, a citizen of the United States, residing at Chicago, in the county of Cook and State of Illinois, have invented certain new and useful Improvements in Sliding Curtains for Vehicles, of which the following is a specification, reference being had therein to the accompanying drawing.

This invention has relation to curtains or side inclosures for automobiles and other vehicles having canopy tops, and has for its object the provision of a novel sliding curtain which can be applied to any automobile having such canopy top and which can be speedily and easily maniplated, so as to tightly close the sides of the vehicle against rain and which, when not required for such use, may be raised and slid back under the top of the canopy and entirely out of the way of the occupants of the vehicle.

According to my invention the sliding curtain embodying the same is made of any suitable material, such as leather, imitation leather, oil cloth, etc., and of a length to reach from the back of the car to the windshield.

Below the roof of the canopy or top a series of hollow metallic supports are arranged, each such support being suspended from a cross member of the canopy frame by any suitable suspending device, such as a clip, attached to the middle part of said cross member, and, when the curtains are raised, they extend between the supports and the canopy or top, entirely out of the way.

The curtains are provided with a series of flexible tubular members, arranged one opposite each of the supporting members of the canopy or top and suitably attached to the curtains, and through each such flexible tubular member extends a flat spring secured at its upper end to the outer end of one of the hollow supports and at its lower end socketed in a clip attached to the upper edge of the body of the car, these flat springs serving to press the curtains against the supporting members of the canopy or top.

My invention consists in the novel construction, combination and arrangement of parts hereinafter more particularly described and claimed, reference being had to the accompanying drawing, in which:

Figure 1, is a transverse vertical sectional view of an automobile canopy top having my invention applied thereto.

Fig. 2 is a vertical sectional view lengthwise of the canopy top, showing one of the sliding curtains in lowered position.

Fig. 3 is a vertical sectional view through one of the curtains Figs. 4, 5, 6, 7, 8 and 9 are detail views of parts of the curtain.

In the drawing 1, designates the canopy top of an automobile of the touring type and 2, one of the folding side members thereof, pivotally attached to the body of the automobile and supporting the top.

3, designates one of the cross members upon which the top 1, is stretched and 4, 4, 4, hollow metallic supports, one of these supports being suspended from each of said cross members by suitable suspending means, such as the clips 5, which are attached to the cross members 3, at the middle of the latter, so as to leave the ends of the supports free and unobstructed.

The supports 4, are open-ended, and are adapted to receive the ends of flat spring strips 6, which serve as guides and lateral stretchers for the curtains 7. The curtains are made of leather, imitation leather, or other suitable material and are provided with flexible tubular members 8, corresponding one to each of the cross members 3, so that when the curtains are raised the flexible tubular members will pass over and embrace the hollow metallic supports 4.

The flexible tubular members 8, are secured to the curtains 7, by means of clips 9, that are stitched or riveted to the curtains and the tubular members are formed with horizontal extensions 18 at their upper ends that extend along the upper edges of the curtains and serve to keep the latter properly stretched.

The flat spring strips 6, are bent to curved form at their upper ends and the said upper ends are formed with tongues 13 of less width than the strips and the latter are shouldered at 14, so that they cannot be thrust too far into the hollow supports 4, and the tongues 13, rest in slots 15, formed in the upper sides of the supports. A plurality of slots 15, is provided in each support, and the tongues of the strips 6 may be engaged in the inner or outer slot according to the tension desired to be given to the strips 6, to cause them to press the curtains more or less tightly against the framing of the automobile top.

The spring strips 6, extend down through the flexible tubular members 8, and their lower ends are socketed in slots 17, formed in metallic clips 16, that are attached to the edges of the body of the automobile.

The spring strips, 6 also pass through stretcher bars 10, that extend along the lower edges of the curtains and serve to maintain these lower edges in stretched condition and cause all the parts of the curtains to act together. The stretcher bars 10, are wide enough to spread the lower part of the curtains so that the outwardly and upturned edges of the curtains will lie at an inclination and serve to shed rain.

The bars 10, extend the whole length of the curtains, from the back of the automobile to the wind shield and the bars are made in sections hinged together, as shown at 10', in Fig. 7, so that the curtains can be folded when not in use.

Tongues 19, are secured to the sides of the curtains, and the curtains can be raised and lowered by means of these tongues and when raised the flexible tubular members 8, slide over the strips 6, and over the supports 4, so that, when raised the curtains lie above the latter and below the canopy top, from which position they can be easily and conveniently withdrawn and lowered.

I claim:

1. The combination with a vehicle canopy or top, of flexible curtains or side inclosures adapted to be shifted from vertical position as side inclosures to horizontal position below the canopy cover, means for supporting said curtains in horizontal position and spirally formed, flexible, tubular members carried by the curtains and extending from edge to edge thereof and adapted to slide over said supporting means and guide the curtains in their movements.

2. The combination with the canopy or top of a vehicle, having cross members to sustain the cover, of curtain sustaining means attached to said cross members between and distant from the ends of the latter, flexible curtains adapted to be shifted from vertical position, as vehicle inclosures, to horizontal position below the canopy cover, said curtains being provided with flexible tubular members arranged and adapted to pass over and inclose the free extensions of said curtain sustaining means when the curtains are raised.

3. The combination with the canopy or top of a vehicle having curtain supports suspended from the cross framing of the canopy cover, of curtains having flexible tubular members adapted when the curtains are raised to pass over and inclose the ends of said curtain supports, and elastic guiding strips extending from the body of the vehicle through said tubular members and into the ends of said curtain supports.

4. The combination with a vehicle canopy or top, of flexible curtains or side inclosures, adapted to be shifted from vertical position as side inclosures, to horizontal position below the canopy cover, said curtains being provided with means for maintaining them in stretched condition at all positions, means attached to the middle of the cross members of the top for supporting said curtains in horizontal position and means for guiding said curtains in their edgewise movements.

In testimony whereof I affix my signature.

ROBERT HOHNBACH.